(12) United States Patent
Murdoch et al.

(10) Patent No.: US 10,032,103 B2
(45) Date of Patent: Jul. 24, 2018

(54) ANTENNA DESIGN AND INTERROGATOR SYSTEM

(71) Applicant: SATO VICINITY PTY LTD, Clayton, Victoria (AU)

(72) Inventors: Graham Alexander Munro Murdoch, Wollstonecraft (AU); Heinz Zollinger, South Wahroonga (AU)

(73) Assignee: SATO HOLDINGS CORPORATION, Tokyo (JP)

(*) Notice: Subject to any disclaimer, the term of this patent is extended or adjusted under 35 U.S.C. 154(b) by 0 days.

(21) Appl. No.: 13/795,398

(22) Filed: Mar. 12, 2013

(65) Prior Publication Data

US 2014/0015648 A1 Jan. 16, 2014

(30) Foreign Application Priority Data

Jul. 13, 2012 (AU) .................. 2012903010

(51) Int. Cl.
| | | |
|---|---|---|
| *H04Q 5/22* | (2006.01) | |
| *G06K 19/07* | (2006.01) | |
| *G06K 7/10* | (2006.01) | |
| *H01Q 1/22* | (2006.01) | |
| *H01Q 7/00* | (2006.01) | |

(52) U.S. Cl.
CPC ..... *G06K 19/0723* (2013.01); *G06K 7/10336* (2013.01); *G06K 7/10376* (2013.01); *H01Q 1/22* (2013.01); *H01Q 1/2225* (2013.01); *H01Q 7/00* (2013.01)

(58) Field of Classification Search
None
See application file for complete search history.

(56) References Cited

U.S. PATENT DOCUMENTS

| | | |
|---|---|---|
| 5,258,766 A | 11/1993 | Murdoch |
| 5,302,954 A | 4/1994 | Brooks et al. |
| 5,319,375 A * | 6/1994 | Gallegro et al. ............... 342/165 |

(Continued)

FOREIGN PATENT DOCUMENTS

| | | | |
|---|---|---|---|
| CN | 203314442 U * | 12/2013 | |
| JP | WO 2012033031 A1 * | 3/2012 | ......... G06K 7/10316 |

(Continued)

OTHER PUBLICATIONS

Smith, Glenn S., Antenna Engineering Handbook Chapter 5: Loop Antennas, 2007, Fourth Edition.*

(Continued)

*Primary Examiner* — Brian Zimmerman
*Assistant Examiner* — Kevin Lau
(74) *Attorney, Agent, or Firm* — Sughrue Mion, PLLC

(57) ABSTRACT

The present invention relates to the identification of RFID devices that are arranged closely together and placed on shelving for logistical and storage purposes. Furthermore, the aspects of the present invention relate to an arrangement and/or layout of antenna coils for example in an interrogator. There is disclosed a RFID interrogator and/or method of interrogating comprising an antenna, when activated, being adapted to radiate an interrogation signal in a first area, means adapted to shift the antenna within a second area, the second area being larger than the first area. The antenna may be mechanically moveable.

24 Claims, 9 Drawing Sheets

(56) References Cited

U.S. PATENT DOCUMENTS

| | | | |
|---|---|---|---|
| 2004/0111335 A1* | 6/2004 | Black | G06Q 10/087 705/28 |
| 2005/0125093 A1* | 6/2005 | Kikuchi et al. | 700/213 |
| 2005/0246248 A1* | 11/2005 | Vesuna | G06K 7/0008 705/28 |
| 2007/0063845 A1* | 3/2007 | Ohishi | 340/572.1 |
| 2008/0252423 A1* | 10/2008 | Murdoch et al. | 340/10.1 |
| 2009/0072949 A1* | 3/2009 | Fukuda | H01Q 1/2216 340/10.1 |
| 2010/0176928 A1* | 7/2010 | Isomura | 340/10.3 |
| 2010/0289624 A1* | 11/2010 | Nakamura | G01S 3/046 340/10.3 |
| 2012/0265391 A1* | 10/2012 | Letsky | A01D 34/008 701/25 |
| 2013/0181876 A1* | 7/2013 | Miura | G06K 7/10316 343/788 |

FOREIGN PATENT DOCUMENTS

| | | |
|---|---|---|
| WO | WO-1996002954 A1 | 2/1996 |
| WO | WO-1999034526 A1 | 7/1999 |
| WO | WO-9949337 A1 | 9/1999 |
| WO | WO-2004019055 A1 | 3/2004 |
| WO | WO-2007/030861 A1 | 3/2007 |
| WO | WO-2009149506 A1 | 12/2009 |

OTHER PUBLICATIONS

Yurtsev et al., Numerical Simulations of Radiation and Scattering Characteristics of Dipole and LOOP Antennas Chapter 8, Sep. 19, 2012.*

* cited by examiner

ANTENNA DESIGN AND INTERROGATOR SYSTEM

FIELD OF INVENTION

The present invention relates to the field of radio frequency identification (RFID).

In one form, the invention relates to systems, devices, and/or objects used in association with RFID. The invention has application in interrogating multiple passive transponders which are associated with objects to be identified by respective transponders and which will be described hereinafter with reference to that application. A specific, non-limiting, application is the identification of RFID transponders or other RFID devices, such as those embedded in plastic tokens or cards that are stacked on each other and placed on shelving for logistical and storage purposes.

In one particular aspect the present invention is suitable for use in the identification of RFID transponders or other RFID devices, such as those embedded in plastic tokens or cards that are arranged closely together and/or are stacked on each other and/or placed on shelving for logistical and storage purposes. Furthermore, the aspects of the present invention relate to an arrangement and/or layout of antenna coils. In another aspect of invention, there is an interrogator including an arrangement of antenna coils.

It will be convenient to hereinafter describe the invention in relation to identification of RFID transponders placed on shelves, however it should be appreciated that the present invention is not limited to that use only.

BACKGROUND ART

The discussion throughout this specification comes about due to the realisation of the inventors and/or the identification of certain prior art problems by the inventors.

The applicants are aware of a number of transponder systems that provide two dimensional, limited three dimensional or full three dimensional interrogator capabilities. These systems utilise a multiplicity of interrogator coils operating in different coordinate axis, to achieve the resultant two or three dimensional operation.

One example of an interrogator which produces a relatively uniform field in three dimensions is disclosed in U.S. Pat. No. 5,258,766 and international application PCT/AU95/00436. This form of interrogator is known as a Tunnel Reader Programmer (TRP). While a TRP has excellent three dimensional interrogation properties, the inventors have realised that this technology is only suitable for applications where the RFID transponders are moved in and out of the TRP, usually on a conveyor or similar. TRP are inherently unsuitable for applications requiring the interrogator to operate on a flat surface such as a shelf, table or wall. For these applications flat planar antenna coils are used currently.

The inventors have also realised that flat planar antenna coils suffer from producing fields in only one direction at any point relative to the coil and do not have a three dimensional interrogation capability.

The inventors have further realised that when items are stored, for example, on shelving, draws or other means of storage, the orientation of the item, and consequently, the orientation of the tag associated with the item cannot be guaranteed to be in alignment with the direction required for interrogation, especially by a flat planar antenna coil. Thus, if RFID and remote powering is used in applications where orientation of items to be identified cannot be guaranteed, such as shelving and storage systems, document tracking, luggage identification, gaming tokens, by way of example only, the above identified problem can lead to items being missed, that is, not correctly identified.

WO2007030861 discloses an antenna design and method of operation which enables a 3 dimensional interrogation field to be created from a flat planar antenna. In essence, the disclosure of WO2007030861 provides for a series of parallel spaced conductors through which currents are sequentially switched in order to produce both tangential and normal magnetic field components. The spatial relationship of the sequentially switched currents is chosen to ensure that at different times a tangential and a normal magnetic field components are produced at the same location. The conductors are preferably arranged in a planar fashion and the tangential and normal magnetic fields are produced above the planar surface. A single layer of parallel spaced conductors provides for two dimensional operations. Adding a second parallel layer of orthogonally oriented parallel spaced conductors provides three dimensional operations where currents are sequentially switched in both layers.

FIG. 1 illustrates, in schematic form, a conventional single coil of rectangular form through which a current flows. The resulting magnetic field directions are shown and related to the X, Y and Z coordinate directions. At different regions above (or below) the coil, the magnetic field has unique direction which is variously in the X, the Y or the Z directions, or some combination of these directions in transition regions. FIG. 2 illustrates these regions.

FIG. 3 shows an array of coils and illustrates how, when appropriately switched, a field in the X, Y and Z directions is produced as described in WO2007030861. In this regard, by suitably overlapping generally rectangular coils and then sequentially switching each coil so that only one coil is active at any time, at any point above (or below) the overlapped coils, a field in the X direction, the Y direction and the Z direction may be produced at some time. In order to suitably switch the coils as shown in FIG. 3, the signal from an RFID reader must be controlled by a MUX circuit which directs the RFID reader signal to each coil in the array in a sequentially manner. In addition to the MUX, special circuits in each coil are required to tune the coils and ameliorate the effects of coupling (both capacitive and inductive) between coils which can lead to the generation of parasitic currents in the inactive coils. These parasitic currents may cause, amongst other things, distortion of the active coil's magnetic field, changes in the active coil's tuning, increase of the active coil's losses and a reduction of the RFID current in the active coil. These parasitic currents are considered undesirable.

Whilst the inventors are aware that the circuits described in Application WO2009149506 control the switching of the coils in the antenna array and ameliorate the effect of stray coupling, they also may add to the complexity and cost of the antenna array. Where a relatively large array area is required, it is considered that both the cost and complexity of the array may become very high. A relatively high cost of a relatively large area antenna array is considered an impediment which may prevent the implementation of RFID in various applications.

Whilst the inventors are aware of a disclosure in WO2009149506 which shows exemplary circuits for both controlling the switching of the coil array and for ameliorating the effect of stray coupling, there is considered to still be a need for providing improved RFID, especially in storage or shelving applications of RFID. Furthermore, there is a need to create an antenna array that can read in 1, 2 or 3 dimensions over a relatively large area, at a reduced cost. Such an antenna would be considered highly advantageous and allow the wide scale adoption of RFID in applications where the high implementation cost has previously prevented the adoption of RFID.

Throughout this specification the use of the word "inventor" in singular form may be taken as reference to one (singular) inventor or more than one (plural) inventor of the present invention.

It is to be appreciated that any discussion of documents, devices, acts or knowledge in this specification is included to explain the context of the present invention. Further, the discussion throughout this specification comes about due to the realisation of the inventor and/or the identification of certain related art problems by the inventor. Moreover, any discussion of material such as documents, devices, acts or knowledge in this specification is included to explain the context of the invention in terms of the inventor's knowledge and experience and, accordingly, any such discussion should not be taken as an admission that any of the material forms part of the prior art base or the common general knowledge in the relevant art in Australia, or elsewhere, on or before the priority date of the disclosure and claims herein.

SUMMARY OF INVENTION

An object of the present invention is to provide an improved antenna design and/or interrogator.

It is an object of the embodiments described herein to overcome or alleviate at least one of the above noted drawbacks of related art systems or to at least provide a useful alternative to related art systems.

In a first aspect of embodiments described herein there is provided a RFID interrogator and/or method of interrogating comprising an antenna, when activated, being adapted to radiate an interrogation signal in a first area, means adapted to shift the antenna within a second area, the second area being larger than the first area.

In a second aspect of embodiments described herein, there is provided a method of and/or apparatus adapted to interrogate a first and/or second area by an RFID interrogator, comprising providing an antenna adapted to radiate an interrogation signal in the first area, and shifting the antenna, while interrogating, within a second area, the second area being larger than the first area.

In a third aspect of embodiments described herein, there is provided a logistics system and/or method of identifying an item having an associated RFID tag, comprising storage means adapted to store the item, and interrogation means as disclosed herein and adapted to interrogate the RFID and thus corresponding identify the item.

In another aspect of embodiments described herein, there is provided a method of creating an arbitrarily large planar RFID reading surface.

In yet another aspect of embodiments described herein there is provided a method of creating an arbitrarily large planar reading surface with any of 1, 2 or full 3 dimensional reading capability.

Preferably, a method of reading and/or interrogation is substantially in accordance with the disclosure in WO2004019055, herein incorporated by reference.

Preferably, a method of reading and/or interrogation is substantially in accordance with U.S. Pat. No. 5,302,954, herein incorporated by reference.

Preferably, a method of power, interrogating and/or communicating with an RFID device is substantially in accordance with WO1999034526, herein incorporated by reference.

Preferably a method of controlling magnetic fields is substantially in accordance with the teaching of WO9949337, herein incorporated by reference.

Other aspects and preferred forms are disclosed in the specification and/or defined in the appended claims, forming a part of the description of the invention.

In essence, embodiments of the present invention stem from the realization that an antenna may be shifted (displaced or moved) in at least one, or in any combination of the x, y and/or z directions in order to create the effect of interrogation by a relatively large antenna array in 1, 2 and/or 3 dimensions. In other words, the present invention provides for a method of creating an arbitrarily large array that can read in 1, 2 or 3 dimensions by shifting an antenna or antenna array in one or more plane(s) to create a large "virtual" array. The process of sequentially switching coils (as used by the prior art) is replaced with at least a single coil, or smaller coil array, which is shifted to a series of positions within an interrogation area, where at each position, interrogation is undertaken or activated in order to mimic the process of sequentially switching an (otherwise) larger coil array. The antenna movement may be continuous, in discrete steps, and any combination thereof.

In other words, in one aspect of invention, there is provided an antenna covering a first area consisting of two or more coils which are sequentially switched and where the antenna is then shifted within a second area. That is, a switched array which covers a smaller area is then shifted to cover a larger area as exemplified in various embodiments disclosed herein.

For the purposes of explaining the present invention, it is assumed that the coil, or coil array, is activated at each position but it is understood that the coil or coil array could be continuously active rather than only being active at each (stationary) position. In accordance with the invention, intermittent activation or activation for portions of time may also be used.

In one example of an aspect of the present invention, a single coil may be shifted to each of the coil positions (coil 1, coil 2, coil 3 and coil 4) as shown in FIG. 3, where upon reaching each of the aforementioned coil positions, the single coil of the present invention is activated and thus reads transponders that may be read by a coil at that location. After the coil has been shifted to each coil position as shown in FIG. 3, the resultant effect is to produce an RFID reading field that is substantially identical to the array shown in FIG. 3 when the array is sequentially switched, but with only one antenna, not four antennas as shown in FIG. 3 of the prior art arrangement. Such a system in accordance with the present invention requires at least one coil, preferably only one coil, and no MUX. It does however require a method of translating the coil in two dimensions. That is a system/method to move the coil in the X and Y directions so that it can be moved to the positions, for example as shown in the embodiment described herein as coil 1, coil 2, coil 3 and coil 4 positions. Such a system may be a mechanical system of wire pulleys or mechanical geared ratchets or any other suitable method of moving the coil. The actual method used for moving the coil may be accomplished by various means, as would be known by the skilled person.

The inventors have further realised that another advantage of the invention when applied to the coil array as described in WO2007030861 and WO2009149506 is that the effective array size is no longer limited to the actual physical size of the array. The inventors have sought to utilise this advantage in association with the present invention, and thus any number of coils can be combined and shifted as described herein to create an arbitrarily large array. Also whilst the overall array size may not limited, the individual coils in the array may be relatively small and therefore may produce only relatively small amounts of radiated interference when activated and compared to a larger single coil. By using a switched shifted antenna, the effect or result achieved by an arbitrarily large antenna can be constructed for reading in 1, 2 or 3 dimensions. In this manner, an antenna in accordance with the present invention which is shifted along a shelf, may provide a similar interrogation of RFID tags on the shelf as a single (large) antenna, the size of the shelf.

The present invention has many applications, including any application where antennas are used to radiate fields, especially for the purpose of interrogation of a remote device. For example, in RFID shelving applications such as general warehousing and the storage of documents, files, books and forensic samples where shelves may be many meters long and require (prior art) antennas that are otherwise likewise many meters long. In a particular application, the present invention may be used in conjunction with RFID devices, such as, by way of example only, RF transponders, tags, tokens, labels, etc. Such devices may be used in a wide variety of applications, including, without limitation, article tracking such as shelving and storage systems, document management or article identification and/or sorting, gaming apparatus and gaming tokens, and luggage identification.

In one form, the invention relates to an identification system, and devices used in the system. Examples of the devices include transponders and/or apparatus adapted to be incorporated into items for storage on shelving and/or in storage systems. Another example of the devices includes transponders and/or apparatus adapted to be incorporated into articles in a secure site, such as legal evidence samples which employ the use of a transponder and/or other identification device attached to the sample(s) for the purposes of monitoring and/or recording movements of the samples. Still another example of the devices includes tokens and/or apparatus adapted to be incorporated into gaming tables and/or devices for monitoring and/or recording gaming or other transactions or movements in a casino, such as gaming transactions which employ the use of a gaming token which token has a transponder and/or other identification device therein.

In another form, the invention relates to a system. Further details are disclosed herein.

Advantages provided by the present invention comprise the following:
  may be used to identify RFID tag on plane surfaces such as tables or shelves
  may be used to create an arbitrarily large reading area
  may be used to create a 1, 2 or 3 dimensional reading volume above and/or below the reading area
  the antenna array cost is kept relatively low because of its relatively small size and relative simplicity;
  the emissions from the antenna array can be kept relatively low because of the relatively small size of the individual antennas used in the array;
  may be utilised to create an arbitrarily large planar RFID reading surface;
  may be utilised to create an arbitrarily large planar reading surface with any of 1, 2 or full 3 dimensional reading capability;
  may be used to create an arbitrarily large reading area at relatively low cost Throughout this specification, reference to a 'tag' includes reference to one or more RFID tags and/or reference to a tag(s) as disclosed in the incorporated disclosures noted above. In one specific form of the invention, a tag may be a label or adhesive note or have any other method of affixing identity to an article or thing in any form, such as a device comprising an Application Specific Integrated Circuit (ASIC) "chip" attached to an antenna or having an antenna attached to it, or where an antenna forms past of the chip assembly itself and where the chip and the antenna structure, including optionally a capacitor or capacitors and which device functions as an inductively powered passive transponder or a battery powered electronic transponder or is a transponder powered by some other means. Without limitation, a tag may be a gaming token, chip, identification device, badge, tag, ticket, playing cards, betting slip lottery ticket, a transponder, an ASIC, chip, an ASIC with an associated antenna assembly, electronic circuitry included in a printed antenna structure, logic means or a tuned antenna.

Throughout the specification, reference to an 'article' includes reference to one or more articles or items. Furthermore, reference to an article may include reference to one 'article' residing in or being associated with another 'article'. An 'article' may refer to any other item that can be identified, traced or tracked, such a postal or courier items, parcels, food, package, baggage, or any other product or good whatsoever.

Throughout this specification, reference to an 'interrogator' or 'interrogated' includes reference to a read only or read and write device or actuator that may power a tag, communicate with a tag, receive information from a tag, read a tag, transmit information to a tag and/or signal to and/or from a tag. This includes for example an RFID enabled regions, stores and/or containers adapted to communicate with tags stored or moved therein.

Throughout this specification, a tag may be rendered in any technology which enables identification.

Further scope of applicability of embodiments of the present invention will become apparent from the detailed description given hereinafter. However, it should be understood that the detailed description and specific examples, while indicating preferred embodiments of the invention, are given by way of illustration only, since various changes and modifications within the spirit and scope of the disclosure herein will become apparent to those skilled in the art from this detailed description.

BRIEF DESCRIPTION OF THE DRAWINGS

Further disclosure, objects, advantages and aspects of preferred and other embodiments of the present application may be better understood by those skilled in the relevant art by reference to the following description of embodiments taken in conjunction with the accompanying drawings, which are given by way of illustration only, and thus are not limitative of the disclosure herein, and in which.

DETAILED DESCRIPTION

Figure 1:
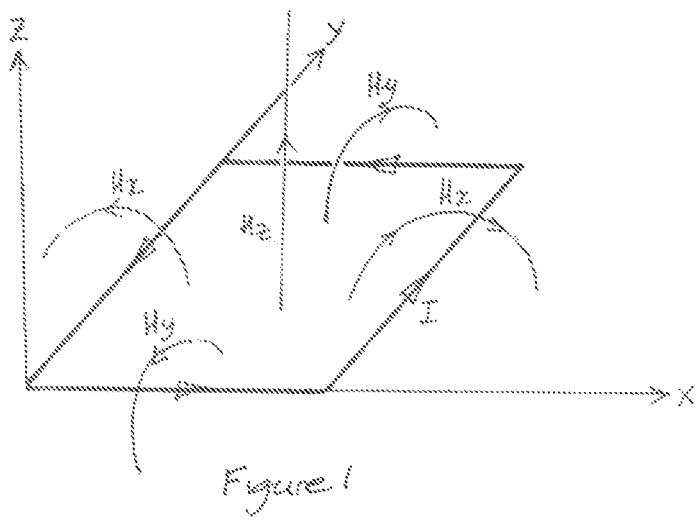
FIG. 1 illustrates, in schematic form, a prior art single coil of rectangular form and its resultant magnetic field when energised.
Figure 2:
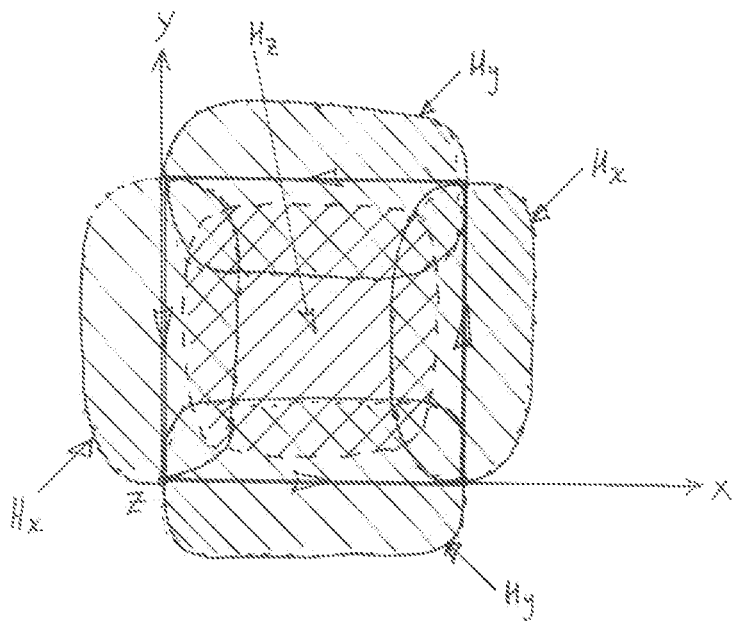
FIG. 2 illustrates regions around the coil of FIG. 1 where magnetic fields are produced.
Figure 3:
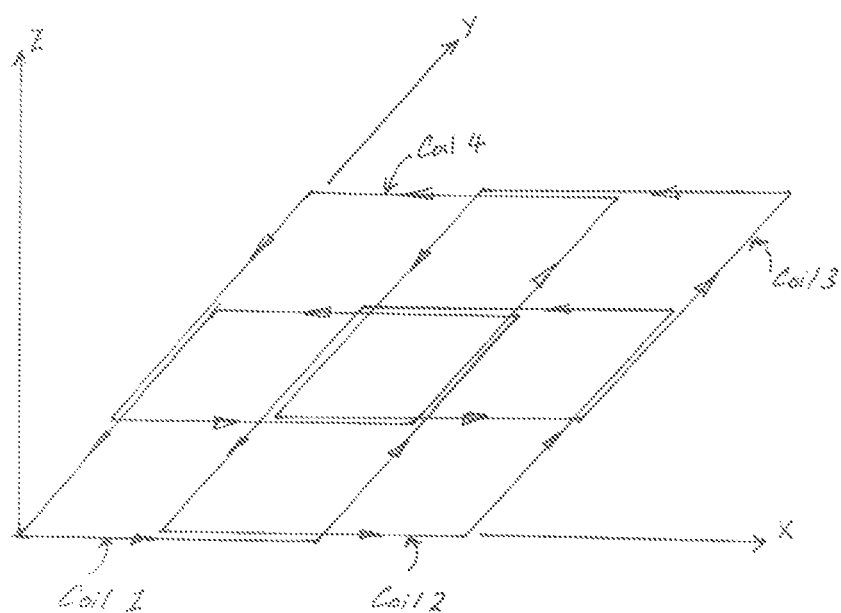
FIG. 3 illustrates an array of coils and illustrates how, when appropriately switched, a field in the X, Y and Z directions is produced as described in WO2007030861.
Figure 4:
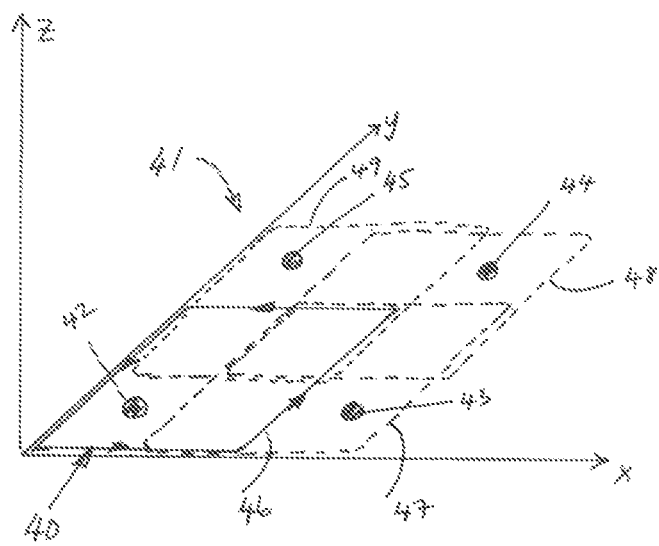
FIG. 4 illustrates a first embodiment of the present invention.

FIG. 4 illustrates one embodiment of an aspect of invention. An antenna 40 is disposed to interrogate an area 41. In accordance with the present invention, the antenna 40 is adapted to be shifted (by suitable means, not shown) in any one or any combination of directions x, y and/or z. In shifting the antenna 40 around area 41, tags 42, 43, 44 and 45 may be interrogated. The line 46 and dotted lines 47, 48 and 49 show various example locations of the antenna 40 when shifted in accordance with the present invention in order to interrogate the second area 41. The single coil shown in FIG. 4, having a first area, can be shifted in the X, Y and/or Z directions in order to interrogate an arbitrarily large area. The antenna 40 may be shifted by mechanical means in accordance with an aspect of the present invention.

Figure 5:
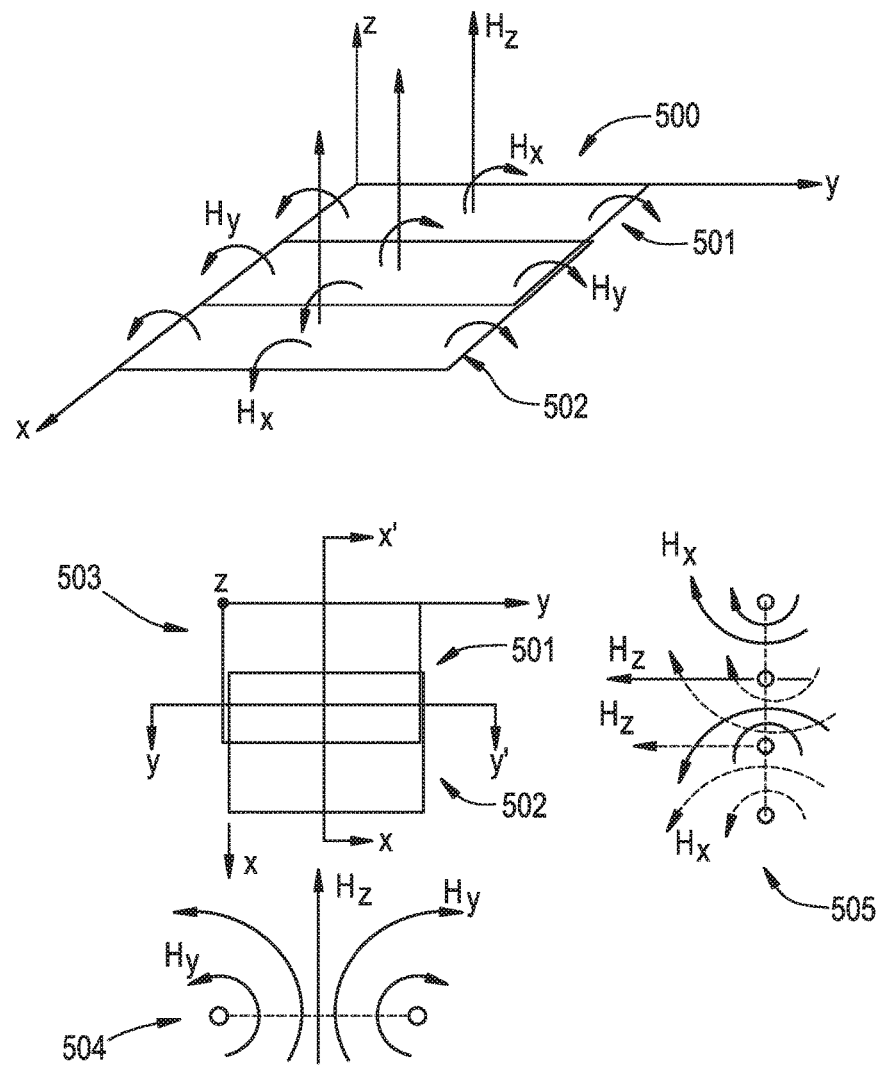
FIG. 5 illustrates an antenna array that may be used in a second embodiment of the present invention.

FIG. 5 shows an array of two coils 501 and 502 in perspective 500 and plan view 503 and their generated fields Hx, Hy and Hz when they are sequentially switched as per WO2007030861 and WO2009149506. The directions X, Y and Z are shown where for the plan view the Y direction is from left to right on the page, X is top to bottom on the page and Z is out of the page surface. A cross sectional cut X-X' is shown and the field 505 above (and below) the coil along the plane of this cut is shown. This field is both in the X direction and the Z direction depending upon which coil is active and the location. There is however always both an X and a Z field direction available at every point above and below the coils when the coils are sequentially switched. A cross sectional cut Y-Y' is shown and the field 504 above (and below) the coil along the plane of this cut is shown. This field is both in the Y direction and the Z direction depending upon which coil is active and the location. There is however always a Z field direction available at every point above and below the coils when the coils are sequentially switched. A field in the Y direction is generated above and below the side edges of the coils. There is no Y field component along the centre cross section X-X'. In accordance with the present invention the antenna array 500 (503) is adapted to be shifted (by suitable means, not shown) in any one or any combination of directions X, Y and/or Z. In shifting the antenna array 500 (503) an area larger than the array 500 (503) may be interrogated.

Figure 6:
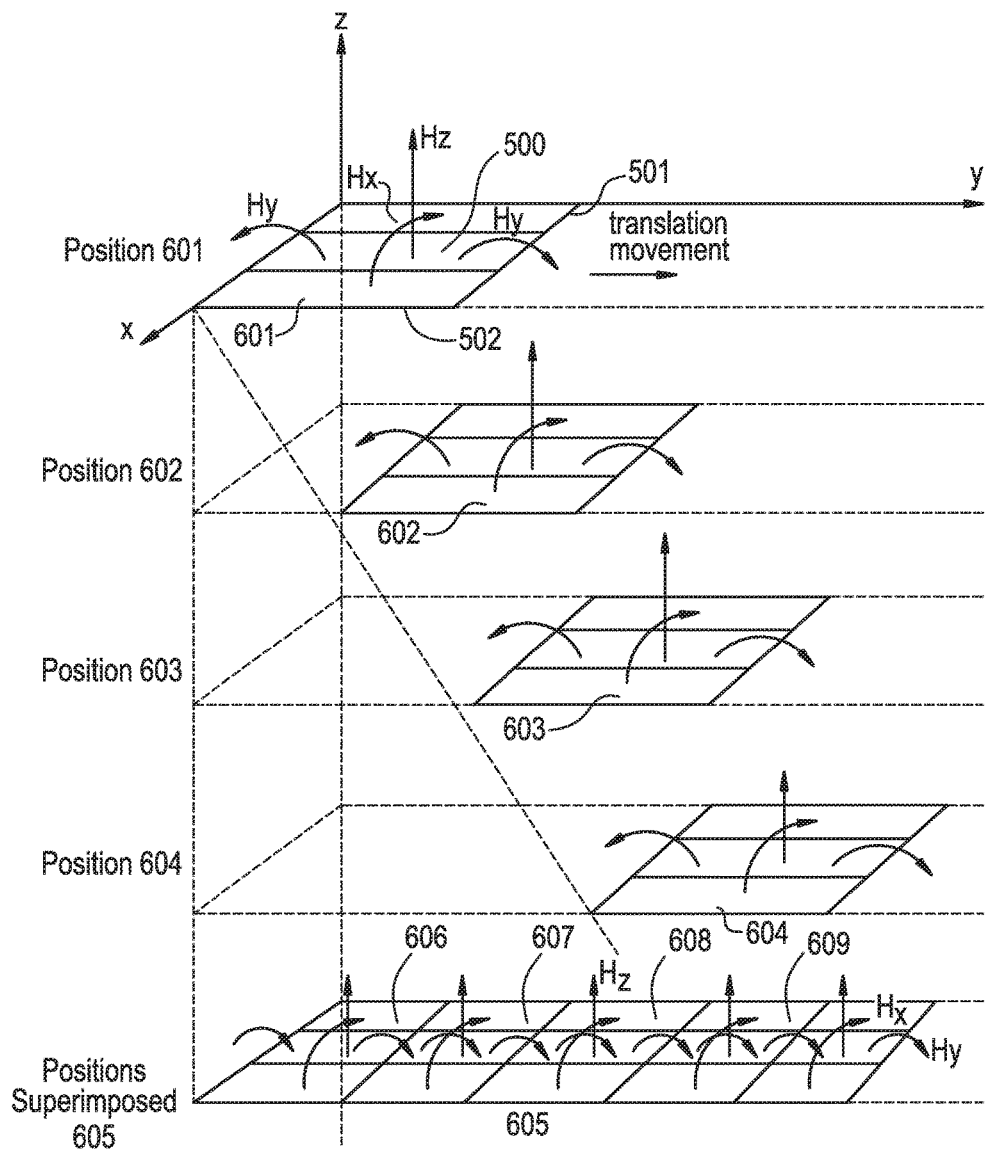
FIG. 6 illustrates a second embodiment of the present invention.

FIG. 6 shows the array 500 of FIG. 5 being translated in the Y direction. The array is shown in a series of positions 601, 602, 603 and 604 and the X, Y and Z direction fields generated as the coils in the array are sequenced. These fields are shown in concept only for clarity. A more complete representation of the field directions as shown in FIG. 5 is too complex to be clearly shown in FIG. 6. FIG. 6 also shows the complete result of superimposing the coil array with itself 605 as it is translated in the Y direction. A complete sequence of X, Y and Z fields are generated above and below the translating coil array and are shown. Whilst the array of FIG. 6 has been shown translating in the Y direction the array could be translated in the X or Z directions or any combination of X, Y and/or Z directions. Tagged items 606, 607, 608 and 609 may be interrogated by the shifting antenna array 500 shown in FIG. 6

Figure 7:
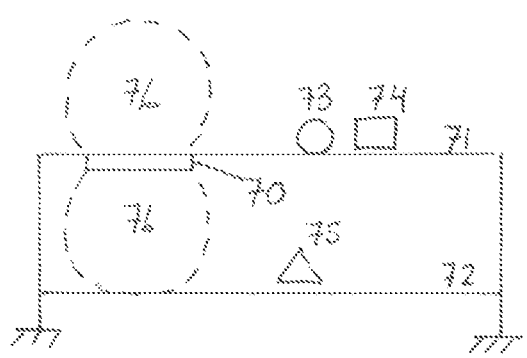
FIG. 7 illustrates another embodiment of an aspect of the invention.

The translating array shown in FIG. 6 could ideally be incorporated into a shelf to create a RFID enabled shelf or shelving system as shown in FIG. 7.

FIG. 7 illustrates another embodiment of an aspect of invention. In this embodiment, an antenna 70 (partially hidden) is disposed within a first shelf 71. Another shelf 72 is also provided. The antenna 70 is adapted interrogate items 73, 74, 75 when provided with suitable signalling. The items 73, 74 and 75 have tags associated with the items and reside on either or both shelves 71 and 72. By shifting the antenna 70 by suitable means (not shown), the items 73, 74 and/or 75 may be interrogated. Given the antenna 70, in this embodiment, is physically constrained within the shelf 71, the antenna movement will be confined to the dimensions of the shelf 71, and thus the antenna 70 is shifted in X & Y directions. The interrogation signal emitted by the antenna may be sufficient to interrogate tags of either or both shelves 71 and/or 72. The volume where a tag is interrogated by antenna 70 is represented by the dotted areas 76. Whilst the text and figures in this document refers to an antenna this can also mean an antenna array and does not limit the complexity or design of the antenna.

Figure 8:
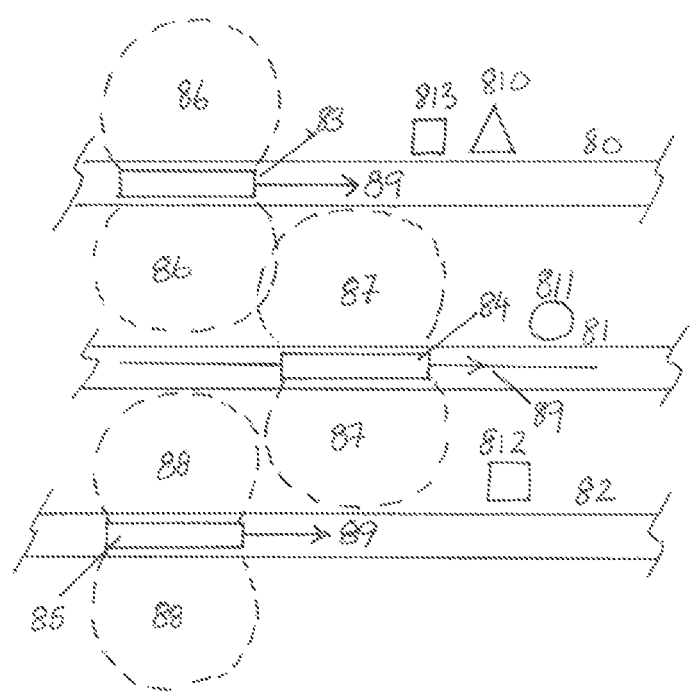
FIG. 8 illustrates a third embodiment of the present invention.

FIG. 8 illustrates a third embodiment of the present invention. A number of shelves 80, 81 and 82 have antenna 83, 84 and 85 respectively disposed within or proximate the shelf. The interrogation field emitted by the antennas 83, 84 and 85 in operation are also shown 86, 87, 88, respectively. The antennas 83, 84 and 85 are adapted to be shifted along their respective shelf 80, 81 and 82, for example by means of a belt or other suitable means 89. Belt 89 has arrows indicating (for example) a direction of travel. The antennas however, may be shifted in any manner in accordance with the present invention. As the antennas 83, 84 and 85 are activated to cause the fields 86, 87 and 88, and moved along the respective shelf 80, 81, and 82, items 810, 811, 812 and 813 stored on, within or proximate each shelf and within the interrogation zone will be interrogated.

The interrogation fields 86, 87 and 88 emitted by the antennas 83, 84 and 85 respectively in operation are shown in stylised form for clarity. It can be seen that as the antennas are shifted the reading volumes will sweep out the full storage volume of the shelves. The interrogation field only needs to reach beyond half way to the next shelf for the overlap of the interrogation fields from antennas to be complete.

The location of tagged items can be inferred from the position of the respective shifting antenna(s) when the tags on the tagged items are identified. The location of tagged items may however be ambiguous because the interrogation field is present both above and below the antenna(s). The interrogation field can be made to be one sided by using a ferrite and aluminium screen as is described in WO9949337.

Figure 9:
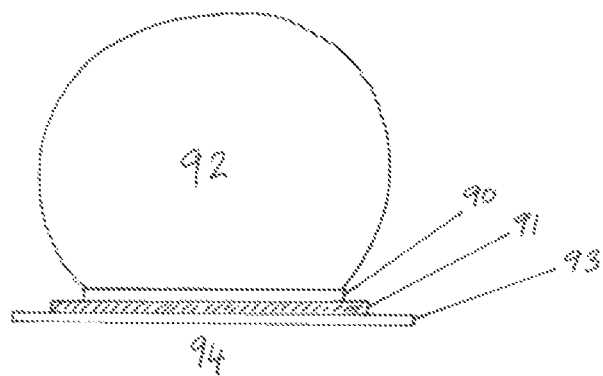
FIGS. 9, 10, 11(a), 11(b), 12(a), 12(b) and 12(c) illustrate still further embodiment(s) of the present invention.

FIG. 9 shows an embodiment of the invention where an antenna 90 has been placed on a ferrite layer 91 to direct the field 92 and an aluminium screen 93 (or other similar high conductivity metal) to preclude the field 92 from the underside of the antenna 94. The screened antenna shown in FIG. 9 will substantially only interrogate tags on one side of the antenna where the interrogation field 92 is present.

Figure 10:
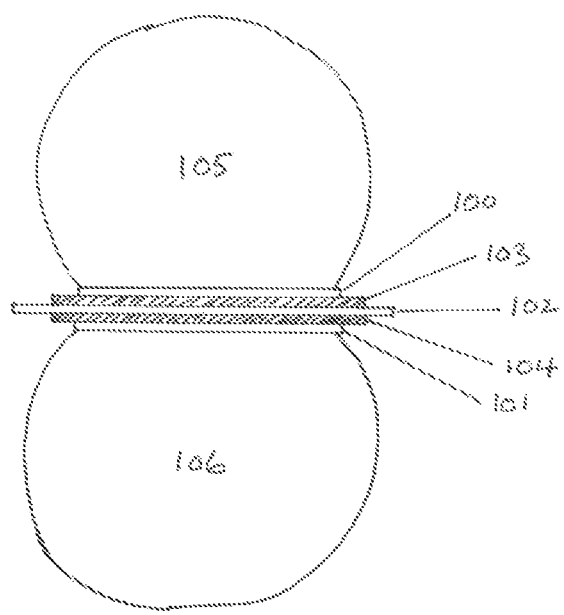

FIG. 10 shows an embodiment of the invention where two antennas 100 and 101 as described in FIG. 9 are placed back to back to form a sandwich structure. A single conductive screen 102 is located between the antennas 100, 101 and the ferrite layers 103 and 104. The interrogation field 105 is produced by antenna 100 and the interrogation field 106 is produced by the antenna 101. This structure has the advantage of separately reading tags both above and below the antenna allowing unambiguous tag location.

FIGS. 11(a), 11(b), 12(a), 12(b) and 12(c) shows various embodiments by which the antenna(s) described by the invention may be moved or translated. These are purely for illustrative purposes and do not in any way imply or limit the methods that may be used to move or translate the antenna(s) or antenna array(s).

Figure 11A:
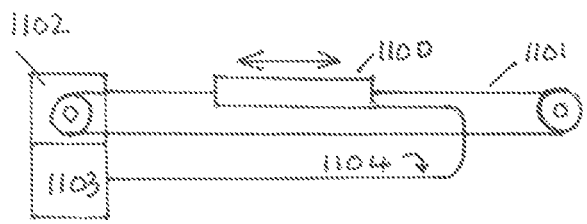

FIG. 11(a) shows an antenna 1100 which is moved by a cable or belt 1101 driven with a motor 1102. An interrogator 1103 is connected by an antenna umbilical cable 1104 to the antenna.

Figure 11B:
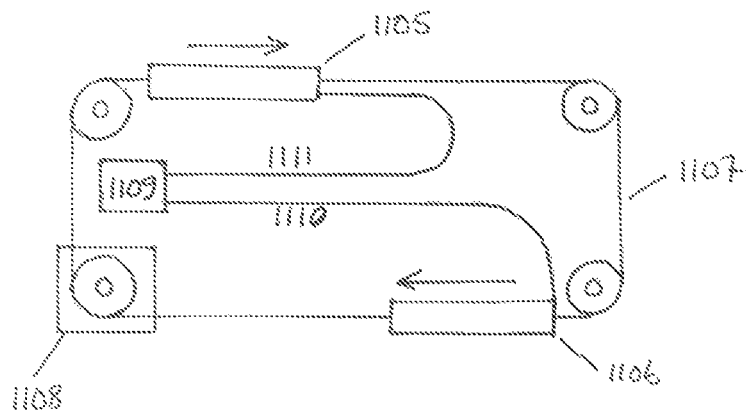

FIG. 11(b) shows how two (or more) antennas 1105 and 1106, suitable for two shelves, can be moved by a cable or belt 1107 driven with a single motor 1108. Further shelf antennas can be simply added and the cable or belt extended to accommodate them. Each antenna will also have a connection to an interrogator 1109 with antenna umbilical cables 1110 and 1111. The length of the shelving will be limited by the length of the antenna umbilical cables.

Figure 12A:
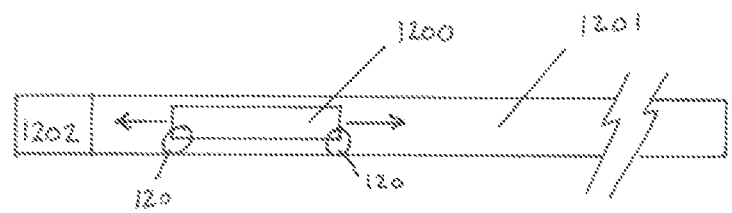

FIG. 12(a) shows an embodiment that uses a standalone interrogator and antenna 1200 which moves inside the shelf 1201 using a locomotion device such as rubber wheels, toothed wheels or a rack and pinion mechanism. The locomotion mechanism is represented by the wheels 120 shown in FIGS. 12(a), (b) and (c) however they are illustrative and it is understood that this is not limited to a wheel or wheel like structure. The standalone interrogator travels the length of the shelf, which may be arbitrarily long, within the limits of the standalone interrogator's internal energy source. The standalone interrogator and antenna 1200 can dock itself with a base station 1202 located at one end (or both ends) of the shelf. The standalone interrogator for example could consist of an interrogator, antenna array with ferrite screen, motor with motor controller and gears and wheels to move the standalone interrogator, a wireless link to the base station, and battery with charging circuits to provide power. The base station can charge the interrogator's onboard batteries. Charging power may be provided by a direct electrical connection or by a non-contact inductive means such as a non-contact inductive powering mechanism. The interrogator can also communicate wirelessly with the base station during operation or directly when it docks. Additional shelves may be added by including a dedicated standalone interrogator for each additional shelf.

Figure 12B:
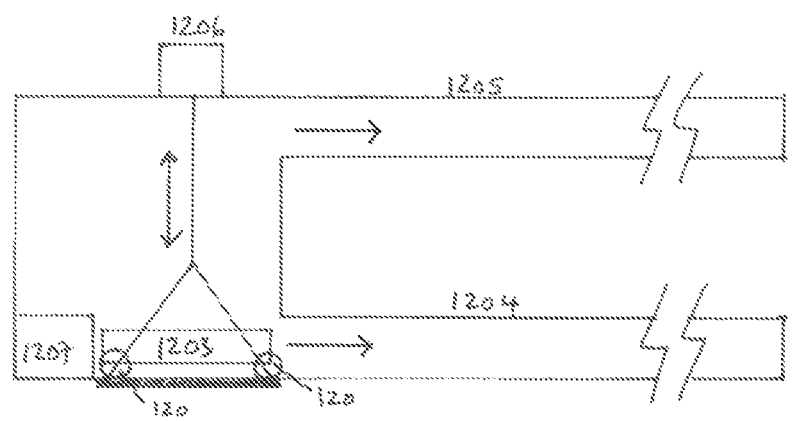

FIG. 12(b) shows how a single standalone interrogator 1203 can be used to service multiple shelves 1204 and 1205. A lifting device 1206 moves the interrogator between shelves. A base station 1207 provides charging and communication and or control of the interrogator 1203.

Figure 12C:
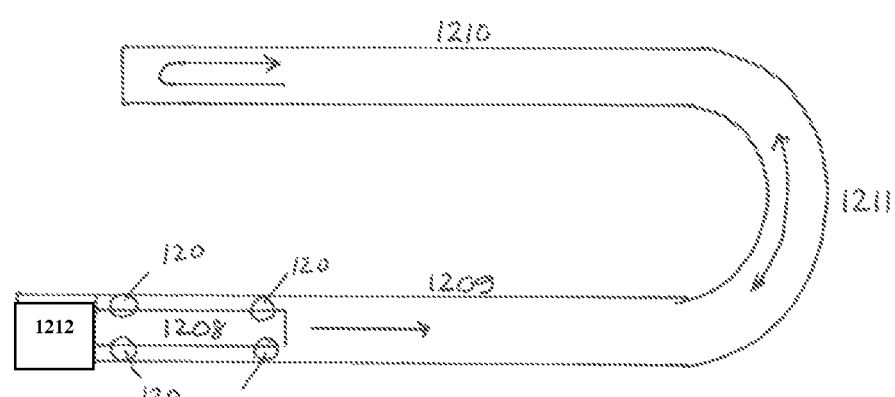

FIG. 12(c) shows how a single standalone interrogator 1208 can be used to service multiple shelves 1209 and 1210. The interrogator drives itself up and/or down curved ramps 1211 located at the end of each shelf in order to reach different shelves. The interrogator inverts itself when it travels through the curve and the locomotion mechanism would need to work with the interrogator inverted. A base station 1212 provides charging and communication and or control of the interrogator 1208.

The embodiments shown in FIGS. 11(a), 11(b), 12(a), 12(b) and 12(c) may be combined in various ways to provide improved functionality or reduced cost.

For example the standalone interrogator may be moved by a belt (or other suitable means) that is driven from a motor at a base station. In this way the stand alone interrogator would not require a motor and drive mechanism. This would be advantageous where a greater pulling strength is required than can be provided by an on board motor and drive mechanism.

Another example standalone interrogator may be connected by an umbilical cable to the/or a base station. The umbilical cable can provide power for the operation of the standalone interrogator. The cable could also provide data communication between the base station and the standalone interrogator. An umbilical power cable does not suffer from the same length limitations as an umbilical carrying RF signals does. A power umbilical can be arbitrarily long where as an RF umbilical may suffer from RF signal attenuation.

A stand alone interrogator moved by a belt (or other suitable means) and connected to a/or the base station with a umbilical cable carrying power could as would have the advantages of the simplicity afforded by the embodiments without the length limitation of the RF umbilical 1104, 1110 and 1111.

While this invention has been described in connection with specific embodiments thereof, it will be understood that it is capable of further modification(s). This application is intended to cover any variations uses or adaptations of the invention following in general, the principles of the invention and including such departures from the present disclosure as come within known or customary practice within the art to which the invention pertains and as may be applied to the essential features hereinbefore set forth.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. The described embodiments are to be considered in all respects as illustrative only and not restrictive.

Various modifications and equivalent arrangements are intended to be included within the spirit and scope of the invention and appended claims. Therefore, the specific embodiments are to be understood to be illustrative of the many ways in which the principles of the present invention may be practiced. In the following claims, means-plus-function clauses are intended to cover structures as performing the defined function and not only structural equivalents, but also equivalent structures. For example, although a nail and a screw may not be structural equivalents in that a nail employs a cylindrical surface to secure wooden parts together, whereas a screw employs a helical surface to secure wooden parts together, in the environment of fastening wooden parts, a nail and a screw are equivalent structures.

"Comprises/comprising" and "includes/including" when used in this specification is taken to specify the presence of stated features, integers, steps or components but does not preclude the presence or addition of one or more other features, integers, steps, components or groups thereof. Thus, unless the context clearly requires otherwise, throughout the description and the claims, the words 'comprise', 'comprising', 'includes', 'including' and the like are to be construed in an inclusive sense as opposed to an exclusive or exhaustive sense; that is to say, in the sense of "including, but not limited to".

The invention claimed is:

1. An RFID interrogator moveable linearly along a movement path in a first direction to read a plurality RFID tags disposed along said movement path, comprising:
an antenna having one or more coils, each coil oriented in an area defined by said first direction and a second direction orthogonal to said first direction, and said one or more coils, when activated, being adapted to radiate an interrogation signal in a third direction that is substantially orthogonal to said first and second directions and within a volume defined by a first area and extending in said third direction, the first area being within a larger second area extending along said movement path;
a switching mechanism for sequential activation of said one or more coils to interrogate RFID tags within the volume defined by said first area; and
a motorized mechanism adapted to move the antenna linearly in at least said first direction to a series of positions within the second area,
whereby said antenna, when moved to each position by said motorized mechanism, and said one or more coils, when each coil is sequentially activated at each position, acts to mimic a process of sequentially switching of the coils in a coil array of an antenna formed with a plurality of coils sufficient to cover the second area, whereby said plurality of RFID tags are sequentially interrogated.

2. The RFID interrogator as claimed in claim 1, wherein the antenna is configurable to operate as a virtual antenna having an area larger than the first area.

3. The RFID interrogator as claimed in claim 2, wherein the virtual antenna has an area less than the second area.

4. The RFID interrogator as claimed in claim 1, wherein the antenna is adapted to be shifted in at least one, or in any combination, of the x, y and z directions.

5. The RFID interrogator as claimed in claim 1, wherein the antenna comprises a single coil.

6. The RFID interrogator as claimed in claim 1, wherein the area of the one or more coils is smaller in size than the first area.

7. The RFID interrogator as claimed in claim 1, wherein the antenna is shifted to a series of positions along said movement path within the second area, and where at each position, interrogation is undertaken or activated.

8. The RFID interrogator as claimed in claim 1, wherein the antenna comprises at least two coils.

9. The RFID interrogator as claimed in claim 8, wherein the coils are sequentially switched, and when activated each coil is adapted to radiate an interrogation signal in the first area.

10. The RFID interrogator as claimed in claim 1, wherein antenna movement includes movement that is at least one from among continuous movement and discrete movement.

11. A method of interrogating a plurality of RFID tags by an RFID interrogator that is moveable linearly along a movement path in a first direction to read the plurality RFID tags disposed along said movement path, the method comprising:
providing an antenna having one or more coils oriented in an area defined by said first direction and a second direction orthogonal to said first direction and adapted to radiate an interrogation signal in a third direction that is substantially orthogonal to said first and second directions and within a volume defined by a first area and extending in said third direction, the first area being within a larger second area extending along said movement path;
moving the antenna linearly along said movement path to a series of positions within the second area by a motorized mechanism;
switching an activation of the one or more coils at each position; and
interrogating at least one RFID tag at each of the series of positions to mimic a process of sequentially switching of the antenna as a coil array,
whereby said antenna, when moved to each position by said motorized mechanism, and said one or more coils, when each coil is sequentially switched to an activated condition at each position, acts to mimic a process of sequentially switching of the coils in a coil array of an antenna formed with a plurality of coils sufficient to cover the second area, whereby said plurality of RFID tags are sequentially interrogated.

12. The method as claimed in claim 11, wherein the antenna is adapted to be shifted in at least one, or in any combination of the x, y and z directions.

13. A logistics system comprising:
a plurality of RFID tags; and
an RFID interrogator moveable linearly along a movement path in a first direction to read a plurality RFID tags disposed along said movement path, said RFID interrogator comprising:
an antenna having one or more coils oriented in an area defined by said first direction and a second direction orthogonal to said first direction, and when activated, being adapted to radiate an interrogation signal in a third direction that is substantially orthogonal to said first and second directions and within a volume defined by a first area and extending in said third direction, the first area being within a larger second area extending along said movement path;
a switching mechanism for sequential activation of said one or more coils to interrogate RFID tags within the volume defined by said first area; and
a motorized mechanism adapted to move the antenna linearly in said first direction to a series of positions within the second area to mimic the process of sequentially switching of the antenna as a coil array to cover the series of positions in the second area by sequentially switching of the one or more coils in the antenna to achieve such coverage, whereby said plurality of RFID tags are sequentially interrogated,
wherein said system is adapted to identify each of a plurality of items having an associated RFID tag and being disposed at least one of above and below a storage shelf, and
wherein the RFID interrogator is moveable in the movement direction and adapted to radiate the interrogation signal in a direction at least one of above and below the shelf and to identify each item by interrogating the associated RFID tag,
whereby said antenna, when moved to each position by said motorized mechanism, and said one or more coils, when each coil is sequentially switched to an activated condition at each position, acts to mimic a process of sequentially switching of the coils in a coil array of an antenna formed with a plurality of coils sufficient to cover the second area, whereby said plurality of RFID tags are sequentially interrogated.

14. The system as claimed in claim 13, further comprising a memory adapted to store a correspondence between the RFID tag and the item.

15. The RFID interrogator as claimed in claim 1, wherein the antenna comprises a first layer of parallel spaced conductors for two-dimensional operations.

16. The RFID interrogator as claimed in claim 15, wherein the antenna comprises a second parallel layer of orthogonally oriented parallel spaced conductors, said first and second parallel layers being arranged for three-dimensional operations.

17. The RFID interrogator as claimed in claim 1, wherein the mimicked process of sequentially switching of the antenna comprises a spatial relationship of sequentially switched currents chosen to provide at different times tangential and normal magnetic fields produced at substantially a same location.

18. The RFID interrogator as claimed in claim 1, wherein the motorized mechanism is powered by at least one onboard battery that is configured to be recharged in response to the RFID interrogator docking with a base station within the second area.

19. The RFID interrogator as claimed in claim 18, wherein the interrogator is configured to automatically dock itself with the base station for charging the battery with power.

20. The method of interrogating by an RFID interrogator as claimed in claim 11, further comprising arranging the plurality of RFID tags on items arranged on a shelf extending along said movement path and wherein the antenna is linearly moved along said movement path using an onboard battery powered motorized mechanism.

21. The method of interrogating by an RFID interrogator as claimed in claim 20, further comprising recharging the onboard battery in response to the RFID interrogator docking with a base station within the second area.

22. The system as claimed in claim 13, wherein said RFID interrogator is moveable within said shelf.

23. The system as claimed in claim 13, wherein said RFID interrogator is operative to read RFID tags on both sides of the shelf.

24. The system as claimed in claim 23, wherein the RFID antenna is a screened antenna operable to read an RFID tag on one side of a shelf and not another side of the shelf.

* * * * *